(12) United States Patent
Wilkinson et al.

(10) Patent No.: US 9,144,739 B2
(45) Date of Patent: Sep. 29, 2015

(54) COMPUTER-AIDED ONLINE CARD GAMES USING MULTIPLE ONLINE PLAYER PREFERENCES

(76) Inventors: Lamar Wilkinson, Pacheco, CA (US); David Fried, Tiburon, CA (US)

( * ) Notice: Subject to any disclaimer, the term of this patent is extended or adjusted under 35 U.S.C. 154(b) by 67 days.

(21) Appl. No.: 13/544,635

(22) Filed: Jul. 9, 2012

(65) Prior Publication Data

US 2013/0178262 A1 Jul. 11, 2013

Related U.S. Application Data

(60) Provisional application No. 61/551,898, filed on Oct. 26, 2011.

(51) Int. Cl.
*G07F 17/32* (2006.01)
*A63F 13/30* (2014.01)

(52) U.S. Cl.
CPC ............... *A63F 13/12* (2013.01); *G07F 17/32* (2013.01); *G07F 17/3293* (2013.01)

(58) Field of Classification Search
CPC ............. A63F 9/24; A63F 1/00; A63F 13/12; G06F 17/32; G06F 17/3293
USPC .................... 463/11, 12, 13, 22, 29
See application file for complete search history.

(56) References Cited

U.S. PATENT DOCUMENTS

| | | |
|---|---|---|
| 2007/0072678 A1 | 3/2007 | Dagres |
| 2007/0155460 A1 | 7/2007 | Burnside |
| 2009/0011829 A1 * | 1/2009 | Yang ............................... 463/29 |
| 2009/0131151 A1 | 5/2009 | Harris |
| 2010/0216534 A1 | 8/2010 | Peck |
| 2011/0177863 A1 | 7/2011 | Davidson |
| 2013/0079083 A1 * | 3/2013 | Chang ............................. 463/11 |
| 2013/0170495 A1 | 7/2013 | Suzuki et al. |

OTHER PUBLICATIONS

Office Action dated Feb. 20, 2015, in U.S. Appl. No. 13/544,620, filed Jul. 9, 2012.
Office Action dated Feb. 13, 2015, in U.S. Appl. No. 13/662,119, filed Oct. 26, 2012.
Amendment dated Oct. 30, 2014, in U.S. Appl. No. 13/544,620, filed Jul. 9, 2012.
Office Action dated Sep. 12, 2014, in U.S. Appl. No. 13/662,176, filed Oct. 26, 2012.
Amendment dated Jan. 28, 2015, in U.S. Appl. No. 13/662,119, filed Oct. 26, 2012.
Amendment dated Jan. 28, 2015, in U.S. Appl. No. 13/662,176, filed Oct. 26, 2012.
Notice of Allowance dated Apr. 17, 2015, in U.S. Appl. No. 13/662,176, filed Oct. 26, 2012.

* cited by examiner

*Primary Examiner* — Pierre E Elisca
(74) *Attorney, Agent, or Firm* — Vierra Magen Marcus LLP

(57) ABSTRACT

A method, computer system, and computer program product to assign player-entries in an online card game. The method commences by receiving preference parameters corresponding to a player, then receiving a player command corresponding to the player to fold out of a current hand of a particular game. For alacrity of play and for supporting a large number of concurrently open tables for an online player to play a large number of games, the method proceeds to identify an open table that satisfies player preference parameters. The preferred game and/or the player's preferred seating arrangement can be determined by using a second preference parameter. The method can respond to a fold-out command by the player and can open a new table on the basis of the player's preference parameters.

19 Claims, 11 Drawing Sheets

COMPUTER-AIDED ONLINE CARD GAMES USING MULTIPLE ONLINE PLAYER PREFERENCES

RELATED APPLICATIONS

The present application claims the benefit of priority under 35 USC 119 to U.S. Provisional Patent Application Ser. No. 61/551,898 filed on Oct. 26, 2011, entitled "System and Method for Online Card Game Participants" which is hereby incorporated by reference in its entirety.

FIELD

The disclosure relates to the field online games of chance. Specifically, the technology relates to procedures for arranging online card games that maximize competition and active participation and more particularly to techniques for online card games using multiple online player preferences.

BACKGROUND

Some embodiments of the present disclosure are directed to an improved approach for implementing online card games using multiple online player preferences.

Certain online poker systems can assign a player to a new table immediately upon folding out of a game at a current table. Yet, sometimes a player might desire to move to another table of a different game type. And in some cases a player might want to move to another table on the basis of some predefined criteria. However, legacy techniques for online poker systems do not support such flexibilities.

Thus, there is a need for techniques of arranging online poker games and providing player tools that exploit the advantages of online communication to deliver an enhanced poker playing experience.

SUMMARY

The present disclosure provides an improved method, system, and computer program product suited to address the aforementioned issues with legacy approaches. More specifically, the present disclosure provides a detailed description of techniques used in methods, systems, and computer program products for online card games using multiple online player preferences.

A method, computer system, and computer program product to assign player-entries in an online card game. The method commences by receiving preference parameters corresponding to a player, then receiving a player command corresponding to the player to fold out of a current hand of a particular game. For alacrity of play and for supporting a large number of concurrently open tables for an online player to play a large number of games, the method proceeds to identify an open table that satisfies player preference parameters, and wherein the open table is an open table (e.g., with fewer player-entries than the open table's capacity). The preferred game and/or the player's preferred seating arrangement can be determined by using a second preference parameter. The method can respond to a fold-out command by the player and can open a new table on the basis of the player's preference parameters.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for implementing online card games using multiple online player preferences. More particularly, disclosed herein are environments, methods, and systems for implementing online card games using multiple online player preferences.

Overview

Card games and other games of chance have been a prominent cultural phenomenon for many years. From neighborhood card rooms to large casinos, gambling enterprises offering organized card games attract millions of players and generate billions of dollars a year in revenue. The advent of the Internet has added a new dimension to multi-player card games. The ability to meet and interact with people remotely has enabled the development of online card games, in which several people in remote parts of the world can participate in the same hand of a card game with a networked computer system. Many companies have emerged that provide increasingly sophisticated services to facilitate online card games. Some involve simulated winnings and allow players to compete purely for sport, not money. Others operate as online casinos or card rooms, offering accounts that players can transfer funds to, receive winnings in, and draw upon to place wagers and cover their losses.

Many online card game systems simulate the structure, rules, and fundamental elements of real-life card games, such as a game room. For example, many online systems retain the concept of a table, wherein each table corresponds to a specific type of game (e.g. poker, blackjack, etc.). A game may be any genre of card game that involves wagering. A game may have multiple variants. Popular variants of poker, for instance, include Five Card Draw, Texas Hold 'Em, Stud and Omaha.

A game or tournament can sometimes be distinguished from another game based purely on criteria such as wagering limits. For example, a Texas Hold 'Em game can be played with predetermined limit for each wager ("fixed limit") such as $3 or $6 per wager, or played with a fixed range for each wager ("spread limit") with a minimum and maximum such as $1-$5 per wager, played where the maximum wager is the size of the current pot ("pot limit"), or played without a wagering limit ("no limit"). Each of these variants with different wagering rules has distinct strategies for playing and wagering.

A game or tournament also may be distinguished from another game based purely on other criteria such as hand rankings or game outcomes. For example, Omaha is often played as a hi-lo split, meaning half the pot is awarded to the person with the highest hand ranking, and half to the person with the lowest hand ranking Each table will have a maximum number of participants, usually ten or fewer. Some players will prefer fewer participants.

Descriptions of Exemplary Embodiments

Figure 1:
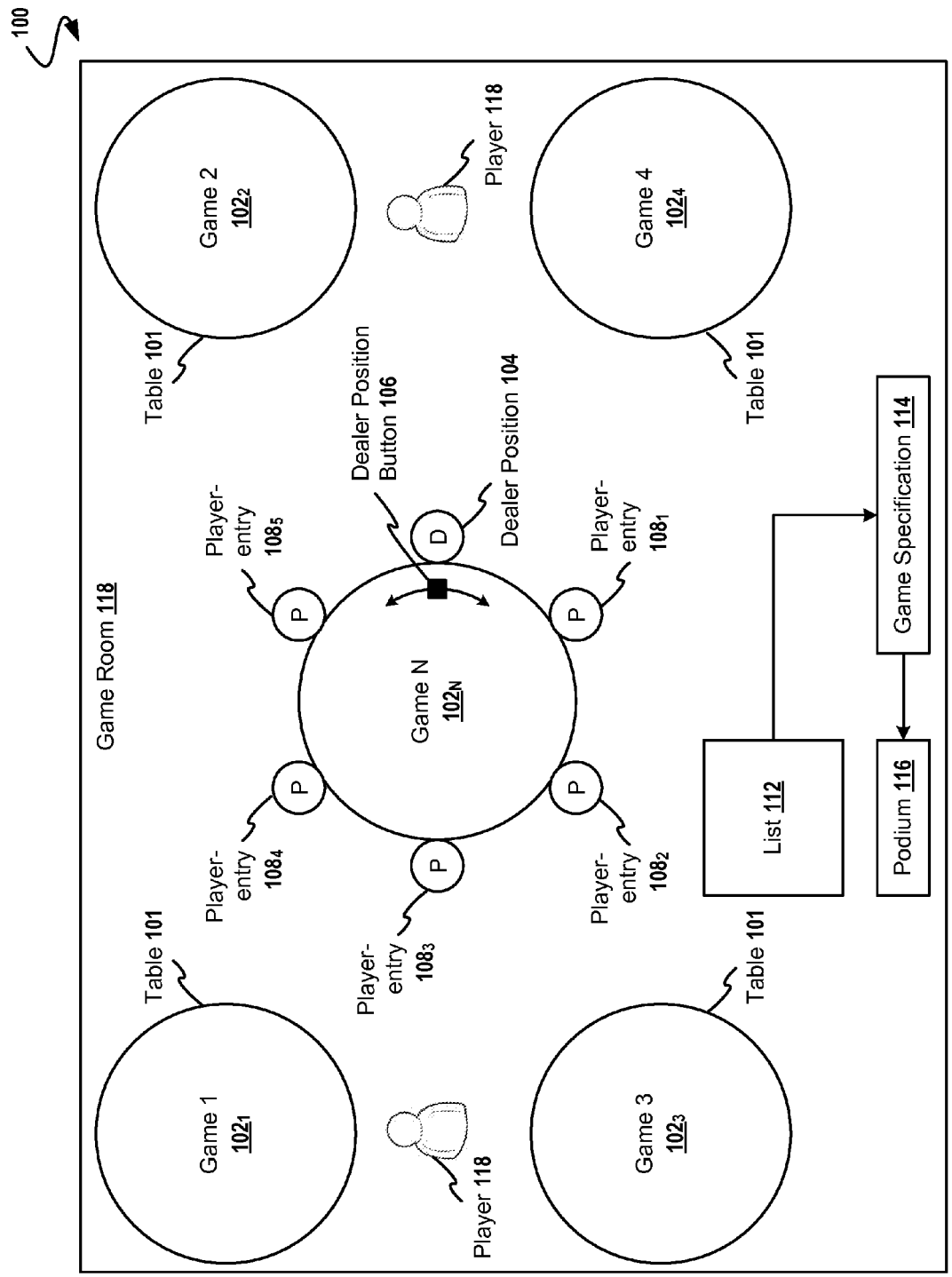
FIG. 1 depicts a schematic for simulating a card room with multiple tables in a system for online card games using multiple online player preferences, according to some embodiments.

FIG. 1 depicts a schematic 100 for simulating a card room with multiple tables in a system for online card games using multiple online player preferences. As an option, the present schematic 100 may be implemented in the context of the architecture and functionality of the embodiments described herein. Also, the schematic 100 or any aspect therein may be implemented in any desired environment.

As previously indicated, online card game systems simulate the structure, rules, and fundamental elements of real-life card games, such as a physical facility (e.g. a game room 118). And, many online systems retain other physical concepts such as the concept of a table 101. In some cases, a table corresponds to a specific type of game (e.g. game $102_1$, game $102_2$, etc.).

In a physical casino or card room, a player will go to a podium and ask for a seat assignment to a table offering one type of poker game. In an online implementation, sites may use a podium 116, and may also use a table assignment method where a player sees the tables (e.g., table 101) available in a virtual lobby (or game room 118), with each table offering a particular poker game in a particular variation. In an online setting, the player scrolls through the list 112, and picks a table with an open seat or goes on a wait list to wait for a table. Sometimes, the player can specify what kind of table they want by specifying a particular poker game or otherwise providing a game specification 114, for example, Texas Hold 'Em 3-6 Limit, and the computer system will look for an open seat at a table of that type or show the player which tables are assigned to that game and also show the betting limit.

In many professionally-operated poker games, the cards are dealt by an entity known as a dealer who is not an actual participant in the game. However, there is a dealer position button 106 signifying the player who is last to act, and the button rotates around the table to each seated position. In some games, certain or all players are required by the rules to wager specific amounts before or when the dealing of a "hand" starts, called "blinds" or "antes". An ante is be paid by all the participating players. A player's obligation to pay blinds, which are initial wagers placed before cards are assigned to a player, may be determined by the player's seat proximity to the dealer. Often, the two persons to the left of the dealer are the first to act and put up their blinds before they see their initial cards. A player's proximity to the dealer determines the order in which the player acts on his set of cards, and the player who acts last, which is the dealer position (the "button"), is at an advantage. Both an instance of a particular card game as well as the set of cards a player has been dealt for that instance are called a hand. Players sometimes will refer to the length of time they play as a playing session, during which time they will see many hands.

In each hand, each player is dealt a number of cards. Some cards may be concealed and assigned only to a particular player who knows the card values. Other cards may be turned faced up and referred to as community cards, used by each participating player as part of their hand. In poker games, players make decisions while they play. For example, at various times during the hand, when it is their turn to act, a player may "fold" their cards, declining to make a further wager and cease participating in that hand; "check", meaning that they are not required to wager at that time and are not folding or wagering; "call" or match another player's wager and remain active in the hand; or "raise", meaning to increase the amount of the wager thus forcing another player to make a decision. Sometimes a player will fold after receiving their initial cards because the cards do not fall within a range of "starting hands" that the player deems worth playing under the circumstances.

The wagers usually are placed into a common "pot" that is awarded to the winner. If everyone except one player folds, the remaining player wins and collects the pot. If two or more players proceed to the end of the hand, the player hand with the higher hand ranking wins. If the players have equal hands, they divide the pot by the number of equal hands.

Players evaluate a number of factors in making playing decisions, including but not limited to their own cards, the order in which they must take action, any community cards shared by all player hands, the odds of certain outcomes, estimations on the cards dealt to other players, the relative amount of a wager against the money that could be won, and anything they have been able to observe regarding the other players. Online systems may provide calculated odds, and/or statistics, and/or advice (see FIG. 2).

Poker can be played as a cash game, meaning that each wager represents money wagered. Poker is also played in a tournament form, where players are given chips that are not redeemable for cash, and play until they lose all their chips or another predetermined event occurs. The winner could be the person who is left with all the chips, or who has the most chips at a predetermined time. Prizes are awarded based on the player's placement among the participants, and the amount of the prizes can be based on player entry fees or a prize pool.

Often, players are interested in playing more than one version of poker, including different variations based on wagering limits. But the player may be limited to the version offered at the table to which they are assigned. In a physical casino or card room, where a player is assigned to and restricted to one table at a time, the player is often compelled to play one particular poker variant unless they give up their seat and change tables, or unless the card room offers a "mixed game" where different variants are played at the same table, and where the players use alternating hands. However, not only are such "mixed games" at a single table uncommon, but the mix of games is determined by the casino or card room operator. A single player cannot determine the mix of games or poker variations that he or she wishes to play while seated at a single mixed-game table. There are sometimes "dealer choice" games, where the dealer position 104 rotates and the person with the dealer button can select the game, but in that instance a player cannot control the poker game choice when not in the dealer position.

The implementation of these elements in on online context raises a number of problems to be solved, and many possibilities for fast-paced and exciting online play. For example, in online poker games where each player is dealt one or more cards that are assigned to them, the player (e.g. represented at a table by a player-entry 108) may make an evaluation of whether the initial cards ("starting hands") they receive are competitive enough to play. By allowing players to fold out of turn and immediately be reseated at another table, game play is speeded up for that player and they can see many more hands per hour.

Players may even have hand ranges they like to play; for example, if seated in an "early" position relative to the dealer, meaning that they are slated to act early and are therefore at a disadvantage, they may only want to play pairs of 7-7 and better, or face cards. If seated in the dealer position or a "late" position, meaning that they are slated to act later and are therefore at an advantage, the player may have a broader range of hands they would play (e.g., without folding) in that position. An online system would allow players, possibly represented by a player given as a player-entry 108 (e.g. player-entry $108_1$, player-entry $108_2$, player-entry $108_3$, etc.), to preselect starting hand ranges, and use a variety of variables (e.g. preference parameters) to express the ranges. Use of two or more preference parameters (e.g., a game preference parameters specification, and a seating preference parameters specification) when assigning a player-entry to an open table is especially effective for players. For example, a player can specify that any starting hands that fall below a player's thresholds for starting hands could be automatically folded (e.g. based on a particular preference parameter). This automation serves to speed up the game and also makes it easier for players to participate in games being played out on multiple tables since a player does not even have to look at the hand or table where an automatic fold occurs. By offering starting hand ranges, the system also helps new players who may not know statistically which hands they should play, but the starting hand system can suggest appropriate ranges. Alternatively, by the player setting starting hand ranges, the game system can hide those tables where the starting hands fall outside the preferred ranges.

In real-life poker, a player is expected to play when it is their turn, and cannot fold or take another action until it is their turn. When a player plays out of turn, they have violated a game rule and their out-of-turn play provides information for the players who still have to make decisions. In online poker, a player can decide to fold at any time, including after they receive their cards and direct that action, but the computer can delay revealing that decision to the other players until it is the folding player's turn to act. In this way, the folding player can make a rapid decision without waiting for other players to act first, but the player's decision does not have to be revealed to the other players until it is that player's turn to act. At the same time, the folding player can be reassigned to another table immediately even if the players at the first table think that the player has not yet acted in the hand at the first table.

Also, when a player folds out of a hand prior to its conclusion, he normally stays seated at the table and observes the outcome of the hand. This has entertainment and educational value, as the player may sharpen his own acumen by observing the remaining players' wagers, interactions, and facial expressions. In addition, in a real-life game, the player has gone to some effort to physically travel to the casino, wait for an open seat, and therefore usually intends to play for several hours during a playing session. Other players physically present at the table also stay seated for longer periods of time. For these reasons, for the player physically present at a table, watching the hand closely even after that player folds may, over time, yield valuable information about the other players that the player can use later in the playing session playing against some or all of the same players.

In contrast, in online poker, players often cannot see or speak to each other. Thus, for an online poker player, there may be less value in observing the conclusion of a hand that the player has folded out of. Also, a player playing online from home, or on a break, or in between appointments may have only 30 minutes or 45 minutes at a time to play, and many other online players may come and go from the table during even a short period of time. Consequently the players may be less interested in close observation of other players and more interested in actively playing as many hands as possible in a short period of time. Furthermore, in card room and casino contexts, players often participate in card games to enjoy the atmosphere, to interact with people, or other social reasons. Because these aspects of gaming are absent from the online context, online poker players usually participate with the goal of maximizing competition and the number of hands played per session.

Figure 2:
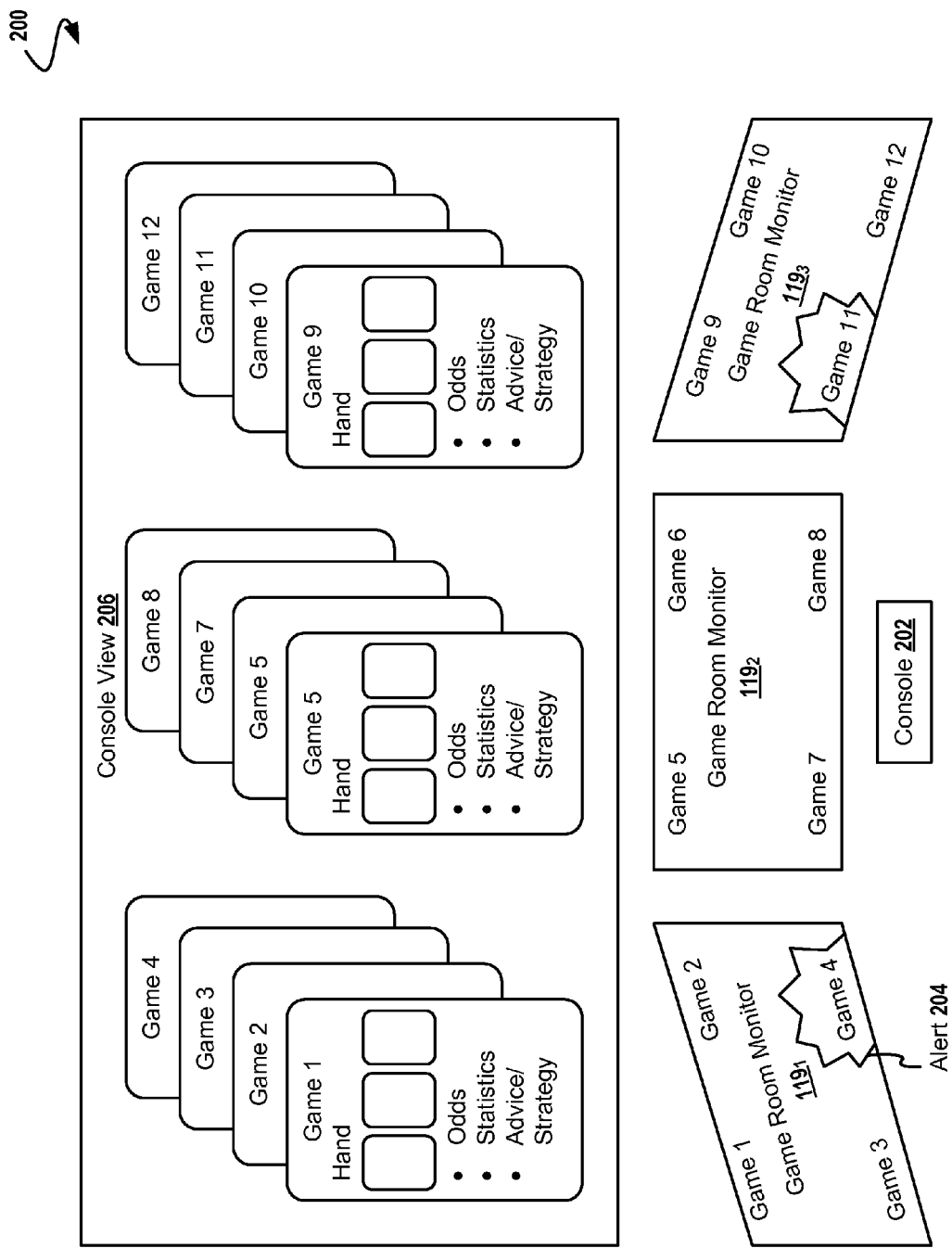
FIG. 2 depicts a schematic of a virtual game room used in a system for online card games using multiple online player preferences, according to some embodiments.

FIG. 2 depicts a schematic 200 of a virtual game room used in a system for online card games using multiple online player preferences. As an option, the present schematic 200 may be implemented in the context of the architecture and functionality of the embodiments described herein. Also, the schematic 200 or any aspect therein may be implemented in any desired environment.

FIG. 2 depicts techniques for giving players more hands per playing session than would be possible in a land-based casino. The virtual aspects allow an online poker player to be "seated" at more than one table at a time and participate in multiple hands simultaneously. In land-based casinos, poker or blackjack players are assigned to a table. Currently, in online poker games, players can choose to play at more than one table at a time, with each seated position being referred to as a player-entry for that player. Using a console 202 such as a screen or a monitor, some players can play at many tables, and a console view 206 is provided to display selected aspects of multiple games. They may use multiple monitors (e.g. game room monitor $119_1$, game room monitor $119_2$, game room monitor $119_3$, etc.) or one or more computer screens. In addition to supporting multiple display surfaces, online game software such as is disclosed herein can also tile the tables or cascade them so they can be overlapped and brought forward or pushed behind.

One drawback of legacy online multi-tabling systems is that in the tiled versions, the tables can be small and a table at which a decision is required needs to create some visible means of alerting the player, which can distract the player. In the cascading versions, when a decision is required at a table, that table will pop up over the rest of the tables. In legacy implementations, even hands where the starting hands are not competitive and the player would always fold are shown to the player. This results in interrupting the player's decision making at a different table for a hand that is competitive. Therefore, the player has to stop focusing on the hand in which they are most interested and direct attention to action pertaining to one or more other tables requiring a decision, even where, under the circumstances, they have no intention of playing the hand on the other table(s). For Instance, if a player is playing on 16 simultaneous tables, and they are involved in a hand on table 3 that they wish to pay added attention to and observe, nonetheless the other 15 tables will pop up or blink or flag the player and require the player's input even if the starting hand on those tables fall outside the player's expressed range of starting hands.

In some embodiments of the present disclosure, alerts 204 are shown to the player at selected times.

Figure 3:
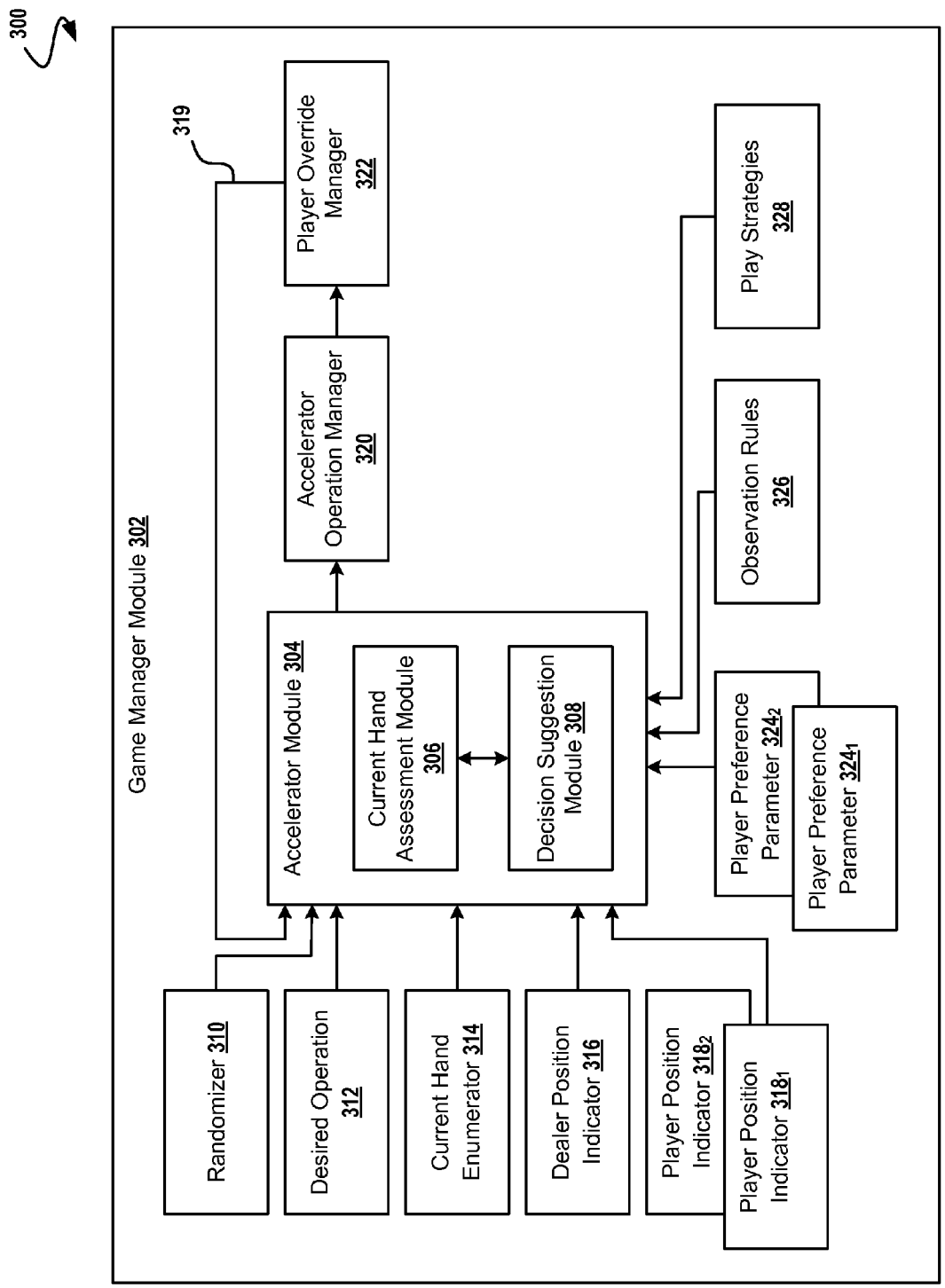
FIG. 3 depicts a schematic of a game manager module used in a system for online card games using multiple online player preferences, according to some embodiments.

FIG. 3 depicts a schematic 300 of a game manager module 302 used in a system for online card games using multiple online player preferences. As an option, the present schematic 300 may be implemented in the context of the architecture and functionality of the embodiments described herein. Also, the schematic 300 or any aspect therein may be implemented in any desired environment.

The system as shown sets starting hand ranges and permits players to fold at any time, automatically fold based on starting hand ranges, or hide those tables where the starting hands fall outside the preferred starting hand range. Such a regime can improve multi-table play. Combined with a method of table creation and a method of automatic reseating (see FIG. 4 and FIG. 5, infra) a player can participate in hundreds of hands per hour, giving attention only to those select hands likely to be profitable.

Some legacy multi-table online systems follow land-based models, and allow the player to specify the games they wish to play by taking a different table assignment for each game type, thereby permitting a player to have one player-entry playing one type of poker, and another player-entry belonging to the same player playing a different poker variant. In this model, the players are compelled to remain at each table in order to see the next hand of the same game, even after they have folded a hand, and until that hand is complete between the remaining players. In such legacy systems, there is no opportunity to fold the hand and immediately have that player proceed to another hand of a different game, unless the player resigns their table assignment and goes back to the game lobby to select and/or wait for another table assignment.

The game manager module 302 of FIG. 3 depicts an online system that allows each player to establish their own game mix and move between online tables seamlessly. This embodiment includes a table assignment system that permits players to identify the game mix they wish to play, and an accelerator module 304 that automatically moves a player between tables or hands to the games they want.

FIG. 3 depicts a system that automatically moves players between tables or hands to the games they want using a game manager module 302. The accelerator module 304 comprises a current hand assessment module 306 and a decision suggestion module 308. The accelerator module accepts a range of inputs including a desired operation 312, a current hand enumerator 314, a dealer position indicator 316, a player position indicator 318 (e.g. player position indicator $318_1$, player position indicator $318_2$, etc.), and a randomizer 310. The accelerator module further accepts inputs in the form of player preference parameters (e.g. preference parameters $324_1$, preference parameters $324_2$, etc.), observation rules 326, and play strategies 328. Some embodiments as disclosed herein also include a feedback loop 319 that serves for managing iterations using the accelerator module (e.g. using accelerator operation manager 320). For example, a player might specify preference parameters to express a desire to join a blackjack game, but may choose to override (see player override manager 322) such a preference should the player tire of blackjack, and want to move to a (for example) poker table for a next game. Play can be accelerated (e.g. using accelerator operation manager 320), especially when the player establishes preferences and follows the flow and/or recommendations of the system based on those preferences.

A table assignment system (e.g. using a game manager module 302) can include such a table creation module (see FIG. 4) to accelerate play, and which automation permits players to identify the game mix they wish to play (e.g., using game type identifiers). An accelerator module automatically moves the players between tables or hands to the games the players have identified. In fact, a table assignment system can serve to identify tables satisfying one or more preference parameters. For example, one possible preference parameter might include a preference for being seated at a table where the table comprises a table with just one fewer player-entries than the open table's capacity, thus the preference for being seated as the last player at a table can be satisfied.

Figure 4:
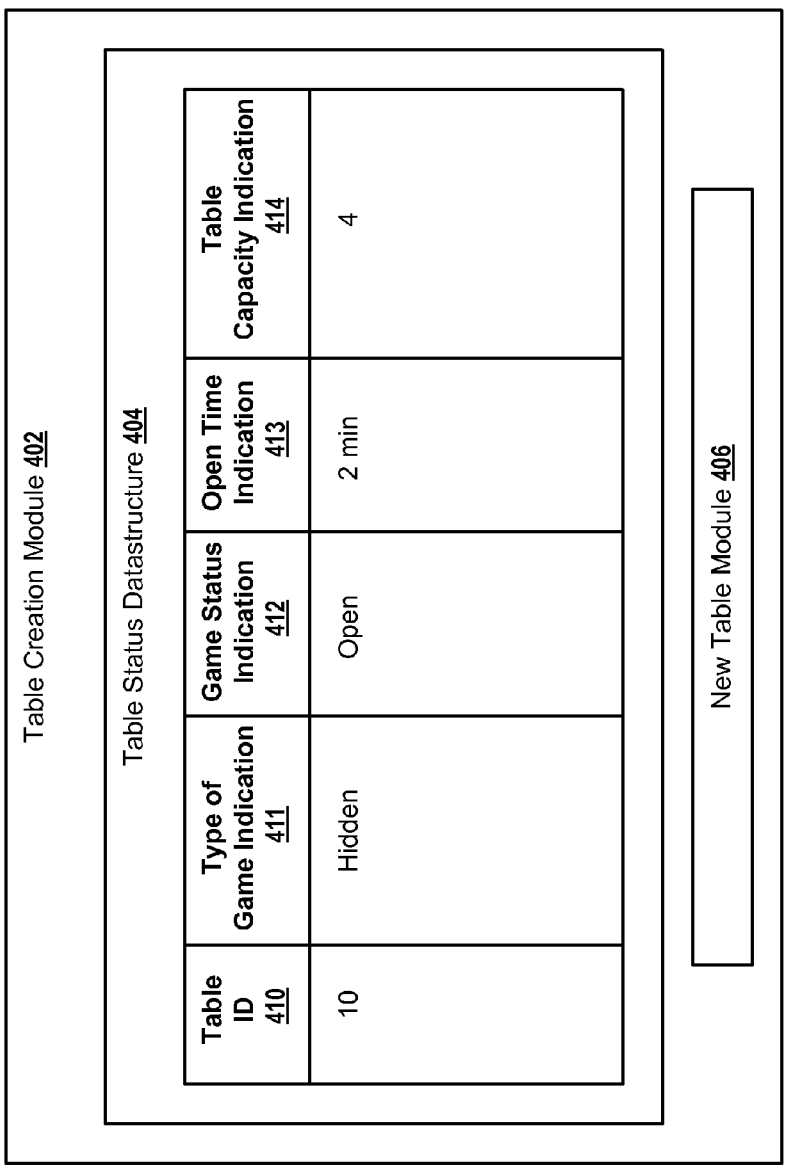
FIG. 4 depicts a schematic of a table creation module used in a system for online card games using multiple online player preferences, according to some embodiments.

FIG. 4 depicts a schematic 400 of a table creation module used in a system for online card games using multiple online player preferences. As an option, the present schematic 400 may be implemented in the context of the architecture and functionality of the embodiments described herein. Also, the schematic 400 or any aspect therein may be implemented in any desired environment.

As shown, the table creation module 402 uses a plurality of player preferences, which player preferences can be included in a datastructure to capture the status of tables (see table status datastructure 404). Such a datastructure, used in conjunction with the disclosed automation, can facilitate more rapid play than is possible in land-based casino settings. For example, even if the player specifies only one kind of poker they wish to play, if the system uses a method for creating poker tables where only one table of each poker variant is open for seating at a time, that open table can be filled more quickly and a hand can begin sooner than if there are two or more identical tables open and players are assigned to each even though neither are yet full and neither hand is ready to start.

Such rapid play can be automated using a table creation module 402. In some embodiments, a table creation module can use a table status datastructure 404 for storing and changing aspects of activities at tables. For example, a table status datastructure can include a table ID 410, the type of game being played (e.g. type of game indication 411) at a particular table, a game status indication 412, an open time indication 413, and a table capacity indication 414. Also, a new table module 406 can handle situations such that a new table can be created in the event that a hand can begin when there are two or more identical tables are open (e.g. same type of game indications) and, even though neither are yet full and neither hand is ready to start, the aggregate of players could be assigned to a new table, and a new hand could start with a full table. In some embodiments, a table capacity indication 414 is an integer count of a number of player-entries that is defined to be the capacity (e.g. a number of player-entries) of the table. It is possible that a single (real person) player can control multiple player-entries, and that a single (real person) player can control multiple player-entries seated at the same table. The new table module can introduce new tables to an open table pool (see FIG. 5).

Figure 5:
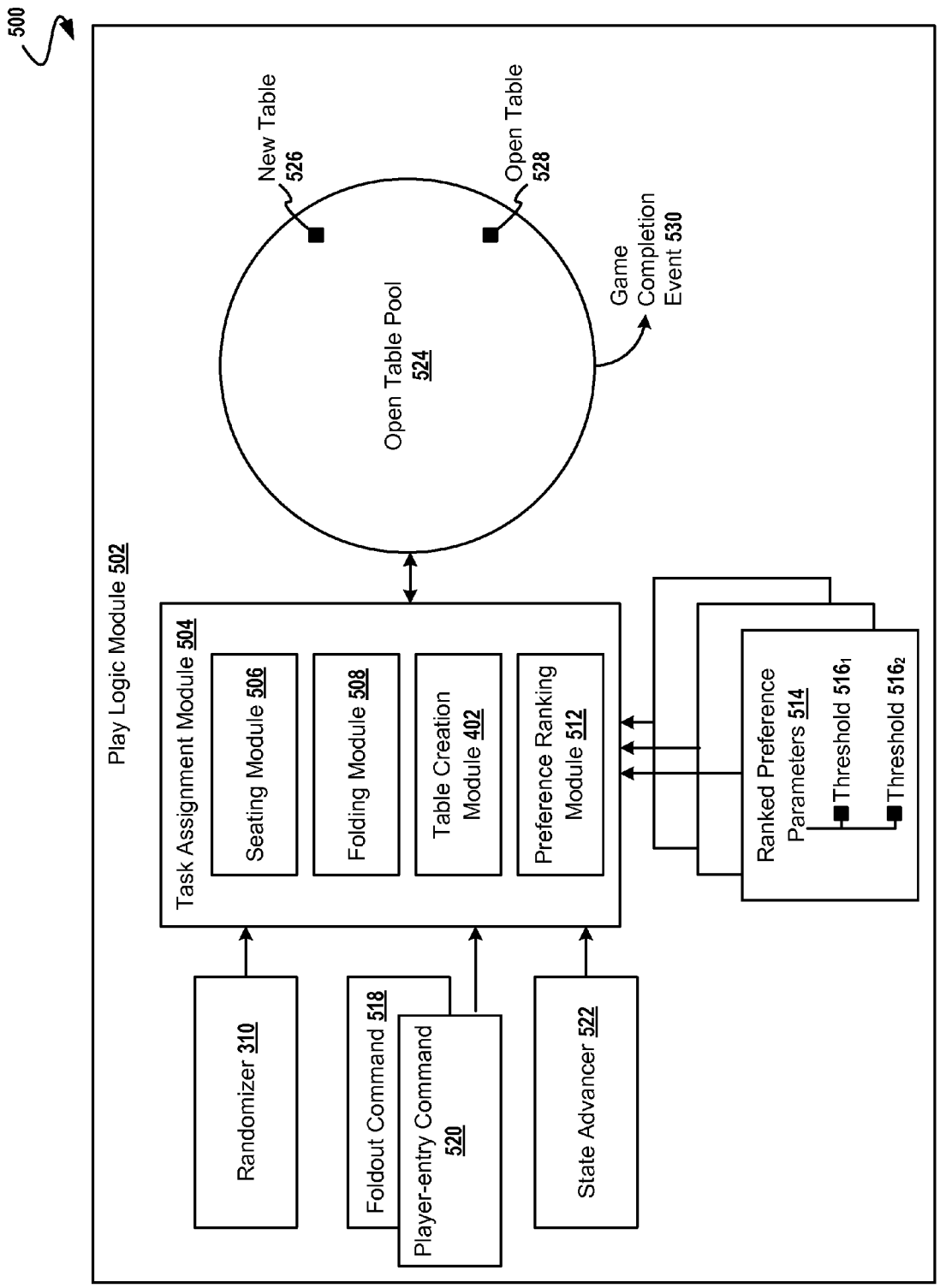
FIG. 5 depicts a schematic of a play logic module used in a system for online card games using multiple online player preferences, according to some embodiments.

FIG. 5 depicts a schematic 500 of a play logic module used in a system for online card games using multiple online player preferences. As an option, the present schematic 500 may be implemented in the context of the architecture and functionality of the embodiments described herein. Also, the schematic 500 or any aspect therein may be implemented in any desired environment.

FIG. 5 depicts a play logic module 502 that manages an open table pool 524 and a set of rules for managing the open table pool. Such a set of rules (e.g. resulting in seating arrangements, folding of hands, etc.) can be implemented by a task assignment module 504. A task assignment module 504 serves to determine the timing of the application of rules. For example, a task assignment module can determine when it is appropriate given a set of rules (e.g. game rules, wagering rules, progression rules) to create a new table 526, or to populate an open table 528, or to eliminate a table (see game completion event 530), and such a determination and actions can be accomplished using a table creation module 402. As further examples, a task assignment module 504 can server to determine what actions are appropriate when a player folds out of a hand (see folding module 508), and what actions are appropriate when a player is to be seated at a new table (see seating module 506). Of course, any of the aforementioned tasks can be performed on the basis of specific player commands (e.g. see player-entry command 520, see foldout command 518) and/or on the basis of rules of progression through the game (e.g. see state advancer 522), and/or even in the basis of some random effects (e.g. see randomizer 310). Still more, a task assignment module can make determinations based on any number of ranked preference parameters 514, and an aggregation of ranked preference parameters (e.g. from different player-entries) can be reconciled using a preference ranking module 512. In some cases one or more of the ranked preferences can be assigned a threshold value 516, and the threshold value can be used in making determinations for ranking preferences (and see the discussion of FIG. 6, below).

A system such as shown in FIG. 5 depicts a computer implemented method of assigning player entries in an online card game. One embodiment of the method comprises receiving two or more preference parameters corresponding to a player-entry for a player (see ranked preference parameters 514) and also receiving a command for the player-entry to fold out of a current hand of a particular game (see foldout command 518). A folding module 508 can match the player's hand to player preferences and advance the state to execute a fold out (see state advancer 522) or, a folding module 508 can merely execute the player's commands (e.g. see player-entry command 520, see foldout command 518). The task assignment module can then begin searching for an open table corresponding to at least one of the preference parameters. In an exemplary situation, an open table with fewer player-entries than the table's capacity can be a good candidate at which to seat the player-entry since a game can begin soon (e.g. as soon as another player is seated at the table), or the task assignment module, possibly in conjunction with a seating module, might amalgamate the player-entries at multiple partial tables into one fully-seated table, and thereby begin a new game. Other preferences are possible, including preferences for being seated first at a table, being seated last at a table, only playing some maximum number of hands of one particular game, and so on. In this manner, the task creation module can assign a player to an open table corresponding to the player's preference parameters.

Figure 6:
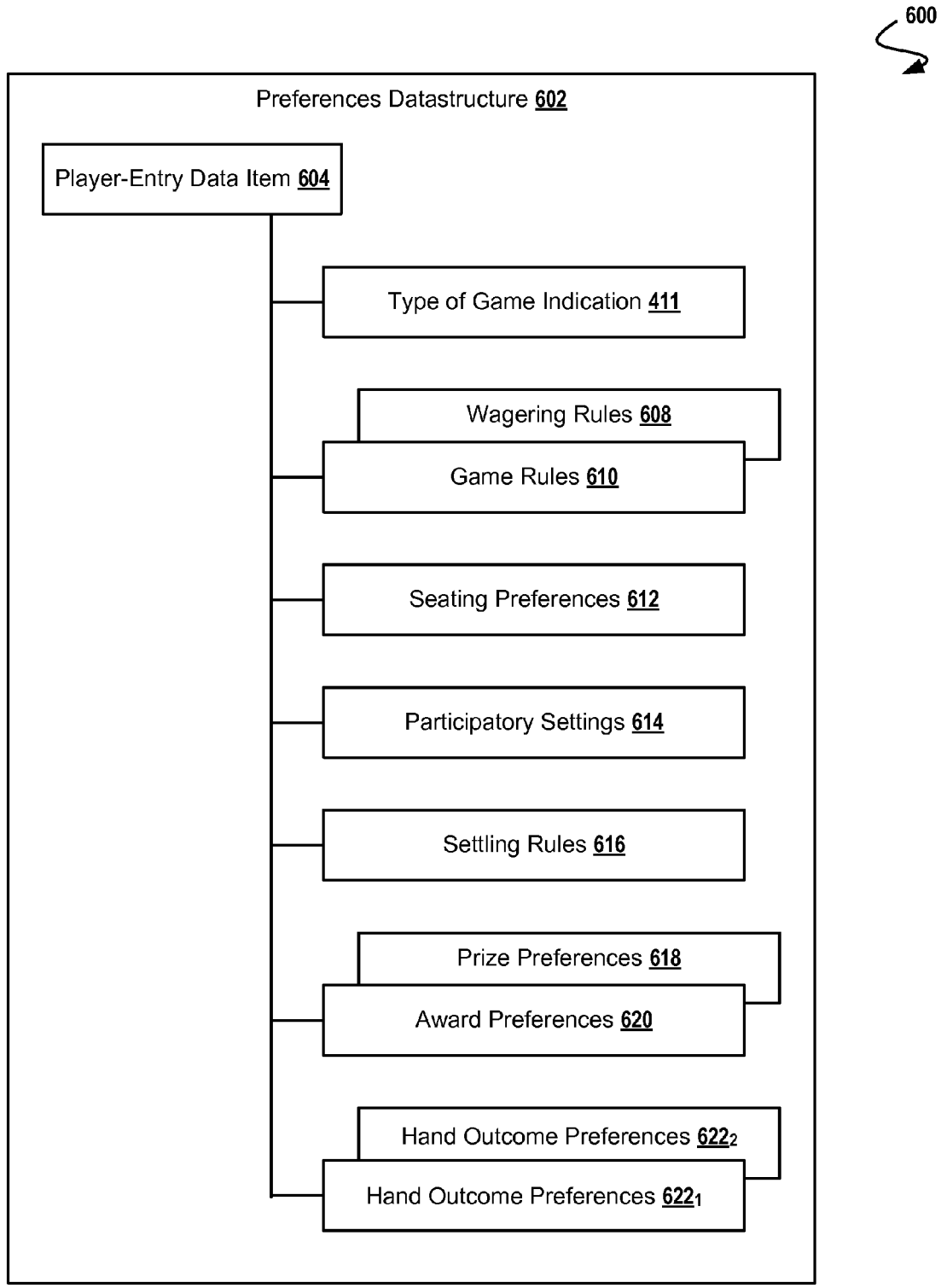
FIG. 6 depicts a graphic representation of a datastructure used in a system for online card games using multiple online player preferences, according to some embodiments.

FIG. 6 depicts a graphic representation 600 of a datastructure used in a system for online card games using multiple online player preferences. As an option, the present graphic representation 600 may be implemented in the context of the architecture and functionality of the embodiments described herein. Also, the graphic representation 600 or any aspect therein may be implemented in any desired environment.

As earlier indicated, online players often do not wish to waste time sitting idle while a hand that they have decided to fold out of proceeds to conclusion. They may wish to fold before it is actually their turn to act. Because in an online implementation, there is little to be gained from such idle time, the goal for players in online poker is usually to maximize the number of hands played during a session. Thus, it is desirable for a player to be assigned to a new table immediately upon deciding to fold out of a hand.

Where players are reassigned after deciding to fold, player table assignments can be improved by having only one table open of a poker variant and filling that table before opening another table. A system that in contrast has a plurality of open tables risks delay because each table may not be full enough to start a hand, or risks having too few players participating in the hand, especially where the poker variation may not be in demand.

Online poker games can also offer the opportunity for players to select two or more poker variations they wish to play ("mixed games"), and to assign players to tables without delay and according to player preferences for the games they wish to play. This may be accomplished with a table assignment system where the player preselects game variations. As soon as a player decides to fold out of a hand or a hand concludes, the player can be assigned to a preselected game which is one of the games they have selected. This may be accomplished by having players rank their preferences by prioritizing tables that already have seated players, or by other means which correspond to the player selected game variation preferences.

FIG. 6 depicts a preferences datastructure 602, which can store preferences for multiple players and/or for multiple player-entries in the form of a player-entry data item 604, which in turn can comprise a type of game indication 411 (and see the discussion of FIG. 4). Exemplary embodiments of a player-entry data item 604 comprise codification of rules (e.g. in the form of one or more game rules 610, one or more wagering rules 608) and the player-entry's seating preferences 612. The seating preferences and participatory settings 614 can be used singly, or in combination to determine player-entry seating.

Further, aspects of award preferences and outcome preferences can be used in combination with settling rules. For example, and as shown, a player-entry data item 604 can comprise award preferences 620, prize preferences 618, settling rules 616, and hand outcome preferences 622 (e.g. hand outcome preferences $622_1$, hand outcome preferences $622_2$, etc.).

Returning to the discussion of FIG. 5, and specifically referring to aspects of table assignments, it can be recognized that a table assignment could be accomplished using a randomizer or a first-available table algorithm that assigns a player to a new table based on a random selection or a determination of availability, respectively. However, such a solution might not take into account the player's preferences of which games and which types of hands he would like to participate in. A player may only be interested in playing a certain type of game, such as Texas Hold 'Em or Five Card Draw. If the network uses a randomizer or a first available table algorithm, the player may potentially be assigned to an Omaha Hold 'Em table and have to endure at least one wasted hand. The player may also be assigned to a table that has too many or too few players for his taste or a minimum or maximum wager that is too high or too low, respectively.

To address this shortcoming, one series of embodiments of the present disclosure provides a technique for a player to specify a set of preferences for his next table and hand. According to one such embodiment, the player would rank various games according to his interest and also could provide a minimum and/or a maximum wagering range. This may be specified in a preferences pane and used for all subsequent sessions, or it may be specified at the beginning of each session and used for that session only. The system can also be used during a hand if the player wishes to change preferences or even specify just the next game. Upon folding out of a hand, the system would immediately attempt to reassign the player to a new table in accordance with his preferences. In a related embodiment, a player may select his next game from a list of available games and wagering limits prior to folding out of his current hand.

In another series of embodiments, the procedure by which new tables are created is regulated according to a series of rules. In one such embodiment, a new table is only created for a particular game when there are no open tables available for that game. An open table is one at which the number of seated players is fewer that the maximum number of players for that table. For example, if a Texas Hold 'Em table is open, no new tables for Texas Hold 'Em poker are created until the existing Texas Hold 'Em table is full. Thus, according to this series of embodiments, only one table for a particular game is open at any given time. The advantage of this series of embodiments is to avoid the scattering of players of a particular game across multiple tables, which may cause dilution of the quality of competition or the creation of a multitude of tables with very few players seated at them.

In another series of embodiments, a player can specify, in a preference setting, a threshold value 516 (e.g. a threshold card combination value) for continuing play. For example, the player may wish to automatically fold out of games in which he is not dealt at least two of a kind as part of his initial hand. This feature is particularly useful in embodiments in which a player participates in multiple hands simultaneously. The player can divide his attention between his multiple hands effectively, and such an "auto-fold" allows the player to focus only on those hands that he deems himself as having a chance of winning Alternatively, the game system can hide tables where the starting hands do not meet the player's specified parameters.

Using the preferences datastructure of FIG. 6, a computer implemented method of assigning player entries in an online card game can be implemented. In some embodiments, the method commences by receiving at least one preference parameter corresponding to a player-entry for a player, then upon receiving a command for the player-entry to fold out of a current hand of a particular game, a module (e.g. a seating module 506 can commence searching for an open table corresponding to at least one preference parameter. If an open table corresponding to the preference parameter is identified, then the seating module (or another module of the implementation) can assign the player-entry corresponding to the identified open table. Of course it is possible that no such open table exists, in which case when it is determined that an open table corresponding to the preference parameter cannot be identified (e.g. there is no such open table in the open table pool) then the method creates a new table corresponding to the preference parameter. The player-entry is assigned to the new table, and play begins when there are a sufficient number of player-entries seated at the newly-created table.

Another issue in playing poker is the difficulty that new players face in first playing cash games or tournaments and wagering money against other players who may be more experienced. Since poker is a game predominately of skill where a player plays against other players, instead of a game of chance with preset odds set by game rules and played against the casino, often new players will be intimidated by other poker players and not want to risk money playing against them. In a casino, giving specific hand direction or advice to a poker player is strictly forbidden. Each player makes their own decisions without advice. However, an online poker game can provide a means of giving players information, statistics, odds, guidance or advice before, during or after the play of a hand, which helps new players adapt to playing poker and improve their poker playing skill. This advice or information can be hidden from other players and makes poker more accessible to casual or new players. These same tools may also be useful to experienced players. Integrating these tools into the poker software would permit players to have information in real time about the hand as it is played, and use the information, strategy and decision suggestions directly in their play by confirming acceptance of a suggestion or even by automatically accepting the suggestions, all of which will improve the speed of the game.

Figure 7:
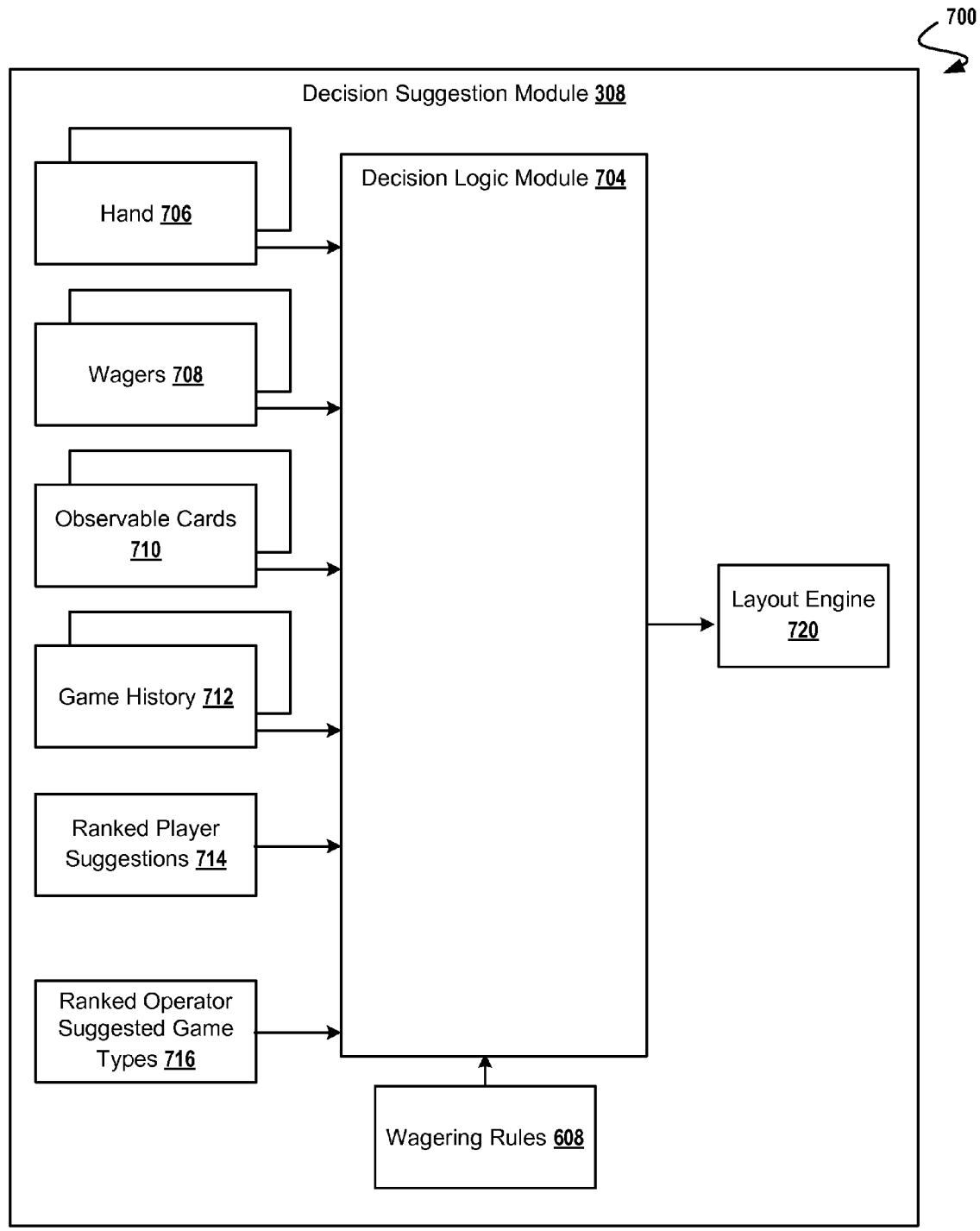
FIG. 7 depicts a schematic of a decision suggestion module used in a system for online card games using multiple online player preferences, according to some embodiments.

FIG. 7 depicts a schematic 700 of a decision suggestion module used in a system for online card games using multiple online player preferences. As an option, the present schematic 700 may be implemented in the context of the architecture and functionality of the embodiments described herein. Also, the schematic 700 or any aspect therein may be implemented in any desired environment.

In addition to the aforementioned techniques to provide real-time information to players about the hand as it is played, there are others that will improve the speed of and player participation in the game.

For example, one possible adaptation of poker to online play involves engaging the player through the allure of prizes or jackpots or forms of promotions awarded to players based on predetermined criteria. Participation fees can be charged separately to each player and can increase progressively in real time. Prize awards can be awarded separately and can increase progressively in real time as well. Land based casinos will sometimes award added prizes or bonuses to players based on their hand ranking (e.g. receiving four-of-a-kind or another "high hand"), or the hand outcome (being dealt two aces but still losing, or getting a "bad beat" when a high hand is beaten by an even higher hand). These jackpots may be funded by the casino by taking added money from each pot when the house takes their collection because charging each player separate small amounts and making change is impractical and would slow the game down. Moreover, the players in a land based casino cannot opt-in or opt-out of the bonus or jackpot as the money is taken from the pot and applied across the board to all players. In addition, all players at the table are participating in the same promotions.

However, in an online implementation, players can opt-in or opt-out of promotional bonuses or jackpots, and can be separately charged for opting in or avoid paying the opt-in fees when they choose not to participate. An online system can collect individual fees and wagers from players and pay players without slowing down the game. An online opt-in system can also mean that players virtually seated at the same table can participate in different promotions from each other, and can participate is many different promotions at a time.

Because a land-based casino or operator usually charges poker players by the hand (by the expedient of taking money out of the pot), the casino often does not allow added or side wagers that would have to be settled separately. Examples of an added wager might be a wager that the next card dealt will be red, that the winning hand will be two pair or better, or where how long they or one or more other players will last in a tournament. Allowing added wagers would require that the land physically-based dealer take added time to settle the added or individual wagers, which would slow down the number of hands per hour dealt for the game. Slowing down each hand to settle side bets would also upset other players interested primarily in the underlying poker game. There is also limited table space for arranging other wagers not in the common pot.

However, in an online system, computer-aided modules can be used to allow players and observers to make side wagers and to settle those side wagers automatically and without slowing down the game. The wagers can involve multiple participants and multiple variations.

In another series of embodiments, players can be presented with an automatically-generated strategy suggested by the system. The suggested strategy may be determined by the system based on the player's hand, the wagers placed by other players up to that point, the position of the player-entry relative to the dealer, the number of other player-entries participating in the hand, the decisions of the other player-entries up to that point, community cards and observable cards of other players, and various well-known principles of poker strategy. This feature allows inexperienced players to learn the game without giving any player an unfair advantage. In one such embodiment, when a player's turn has arrived, the player may be presented with a suggested wager. The player may be given the option to accept the suggestion, reject the suggestion, or use the suggestion as a baseline that can be adjusted upwards or downwards to set the player's actual wager. In one embodiment, the suggestion may vary even in similar hands or identical circumstances in order to avoid repetition of the same suggestions. In another embodiment, the strategy suggested to a player-entry may be hidden from other player-entries. The player may have the option to decide, in a preference setting, whether to automatically accept all suggested wagers, reject all suggested wagers, or adjust all suggested wagers by one or more values.

The foregoing can be implemented in an online setting. The schematic 700 of FIG. 7 depicts a decision suggestion module 308, which serves to present suggestions for play, including a suggested wager. As shown, the decision suggestion module 308 includes a decision logic module 704, which can take in a variety of inputs such as a hand 706 (e.g. the current hand, the last hand, etc.), wagers 708 and wagering rules 608, a game history 712, and in some cases, one or more sets of observable cards 710. Using the aforementioned inputs and logic/rules within decision logic module 704, suggestions for play can be presented to a player. Such suggestions can include a series of suggestions that are organized based on the preference of the player (e.g. see ranked player suggestions 714) and/or suggestions that are organized based on the preferences or suggestions of the game room operator (e.g. see ranked operator suggested game types 716). The suggestions can be presented in a variety of ways, including display on the display surface of a game room monitor 119, or as an image within a console view 206. A layout engine 720 can be employed to present suggestions, including by displaying suggestions on a display surface.

Finally, in an online game, it is easy for people who not actively participating in a hand to make a side bet. That is persons observing the virtual table or tournament, can easily wager on the outcome of the hand or tournament, or make a side bet. In an online system, hundreds or even thousands of people or more can be allowed to remotely observe a game or hand and can be allowed to make related wagers.

Figure 8:
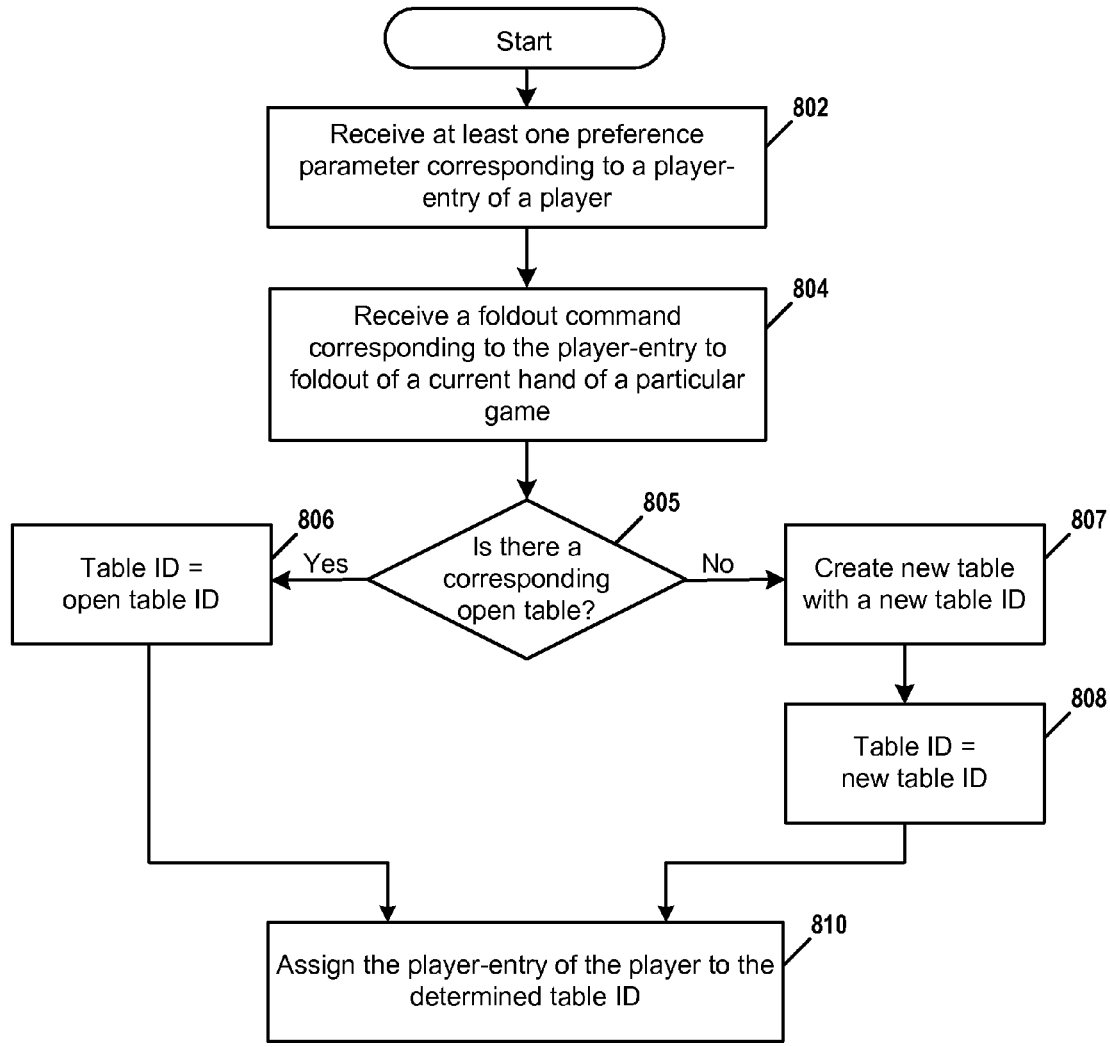
FIG. 8 depicts a flow chart of table assignment logic used in a system for online card games using multiple online player preferences, according to some embodiments.

FIG. 8 depicts a flow chart 800 of table assignment logic used in a system for online card games using multiple online player preferences. As an option, the present flow chart 800 may be implemented in the context of the architecture and functionality of the embodiments described herein. Also, the flow chart 800 or any aspect therein may be implemented in any desired environment.

The flowchart of FIG. 8 depicts a flow chart used in a computer implemented method of assigning player-entries to tables in an online card game. The method commences at "start" and the method receives preference parameters corresponding to a player-entry of a player (see operation 802). Then, during the course of play, the computer implemented method receives a foldout command (see operation 804) corresponding to the player-entry to fold out of a current hand of a particular game and the method determines if there is an open table that satisfies the preference parameters (see decision 805). If so, then the system will establish a variable "table ID" to represent the identified open table (see operation 806). However, it is possible that there is no satisfying open table. In such a case the system will create a new table (see operation 807) and establish a variable "table ID" to represent the newly-created table (see operation 808). Once a table has been identified, then the method assigns the player-entry of the player to the determined table ID (see operation 810).

Additional Embodiments of the Disclosure

Figure 9:
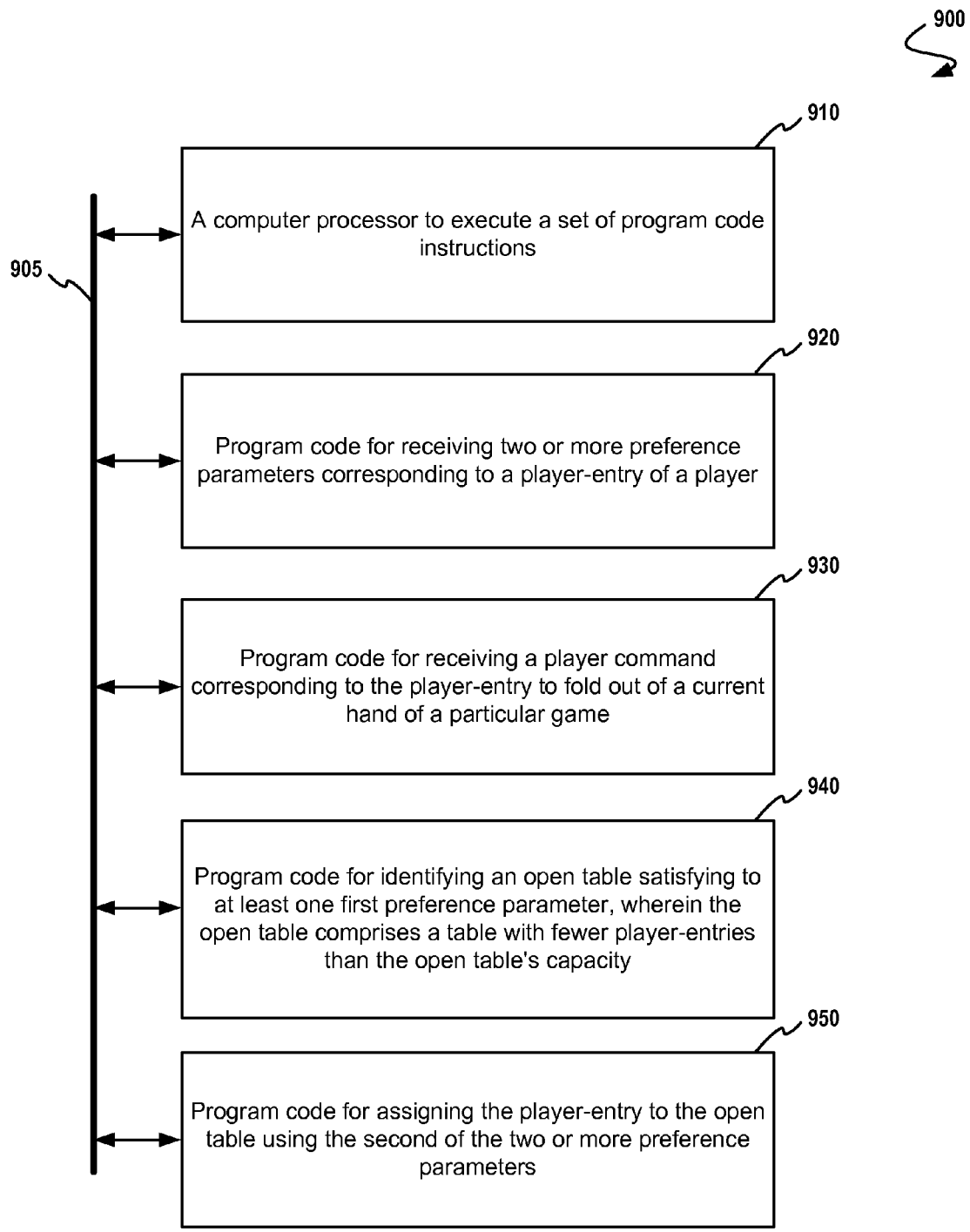
FIG. 9 depicts a system for online card games using multiple online player preferences, according to some embodiments.

FIG. 9 depicts a system 900 for online card games using multiple online player preferences. As an option, the present system 900 may be implemented in the context of the architecture and functionality of the embodiments described herein. Of course, however, the system 900 or any operation therein may be carried out in any desired environment.

As shown, system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with other operations over communication path 905. The modules of the system can, individually or in combination, perform method operations within system 900. Any operations performed within system 900 may be performed in any order unless as may be specified in the claims.

The embodiment of FIG. 9 implements a portion of a computer system, shown as system 900, comprising a computer processor to execute a set of program code instructions (see module 910) and modules for accessing memory to hold program code instructions to perform: receiving two or more preference parameters corresponding to a player-entry of a player (see module 920); receiving a player command corresponding to the player-entry to fold out of a current hand of a particular game (see module 930); identifying an open table satisfying to at least one first preference parameter, wherein the open table comprises a table with fewer player-entries than the open table's capacity (see module 940); and assigning the player-entry to the open table using the second of the two or more preference parameters (see module 950).

Figure 10:
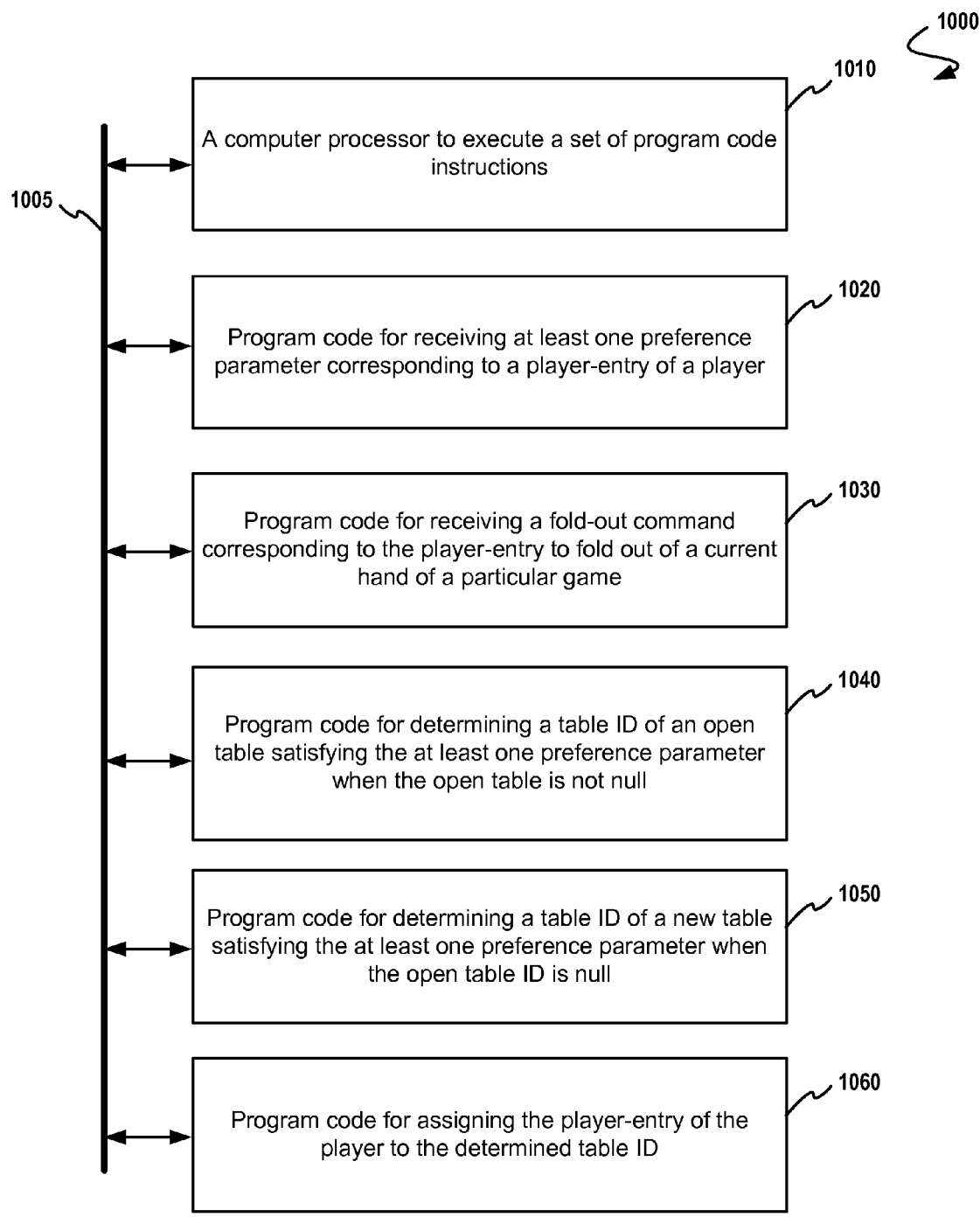
FIG. 10 depicts a system for online card games using multiple online player preferences, according to some embodiments.

FIG. 10 depicts a system for online card games using multiple online player preferences, according to some embodiments. FIG. 10 depicts a block diagram of a system to perform certain functions of a computer system. As an option, the present system 1000 may be implemented in the context of the architecture and functionality of the embodiments described herein. Of course, however, the system 1000 or any operation therein may be carried out in any desired environment.

As shown, system 1000 comprises at least one processor and at least one memory, the memory serving to store program instructions corresponding to the operations of the system. As shown, an operation can be implemented in whole or in part using program instructions accessible by a module. The modules are connected to a communication path 1005, and any operation can communicate with other operations over communication path 1005. The modules of the system can, individually or in combination, perform method operations within system 1000. Any operations performed within system 1000 may be performed in any order unless as may be specified in the claims. The embodiment of FIG. 10 implements a portion of a computer system, shown as system 1000, comprising a computer processor to execute a set of program code instructions (see module 1010) and modules for accessing memory to hold program code instructions to perform: receiving at least one preference parameter corresponding to a player-entry of a player (see module 1020); receiving a foldout command corresponding to the player-entry to fold out of a current hand of a particular game (see module 1030); determining a table ID of an open table satisfying at least one preference parameter when the open table is not null (see module 1040); determining a table ID of a new table satisfying at least one preference parameter when the open table ID is null (see module 1050); and assigning the player-entry of the player to the determined table ID (see module 1060).

System Architecture Overview

Figure 11:
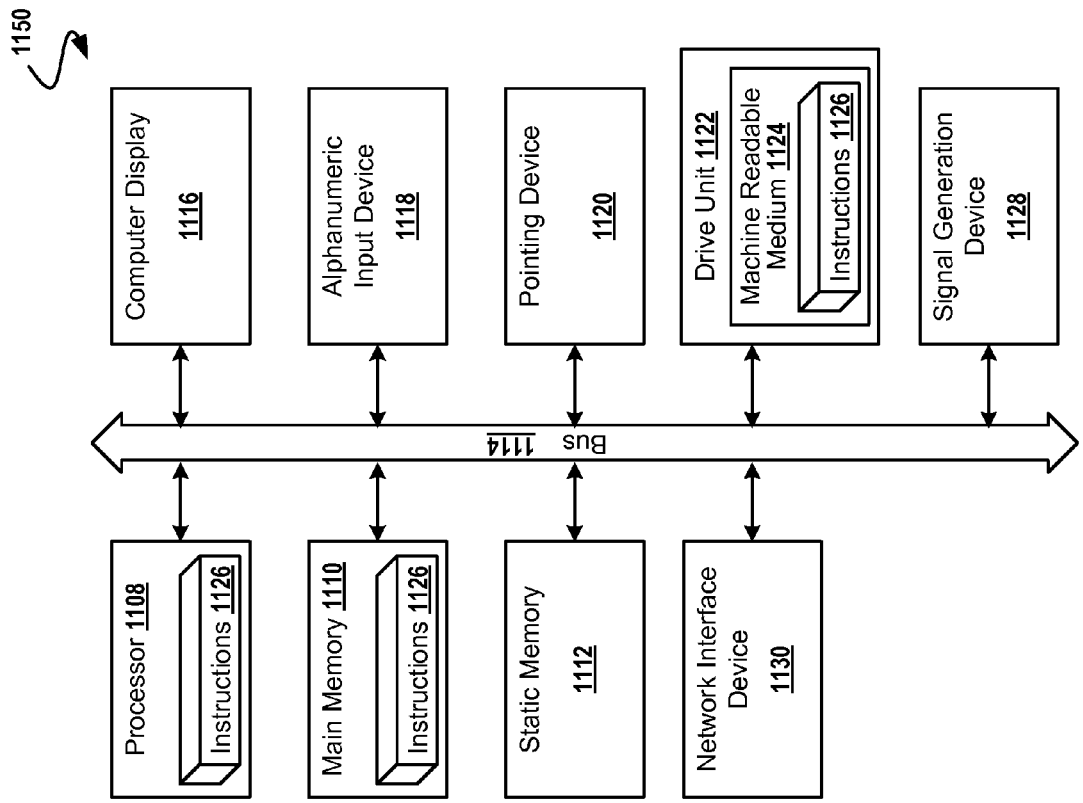
FIG. 11 depicts a block diagram of an instance of a computer system suitable for implementing an embodiment of the present disclosure.
Figure 11:
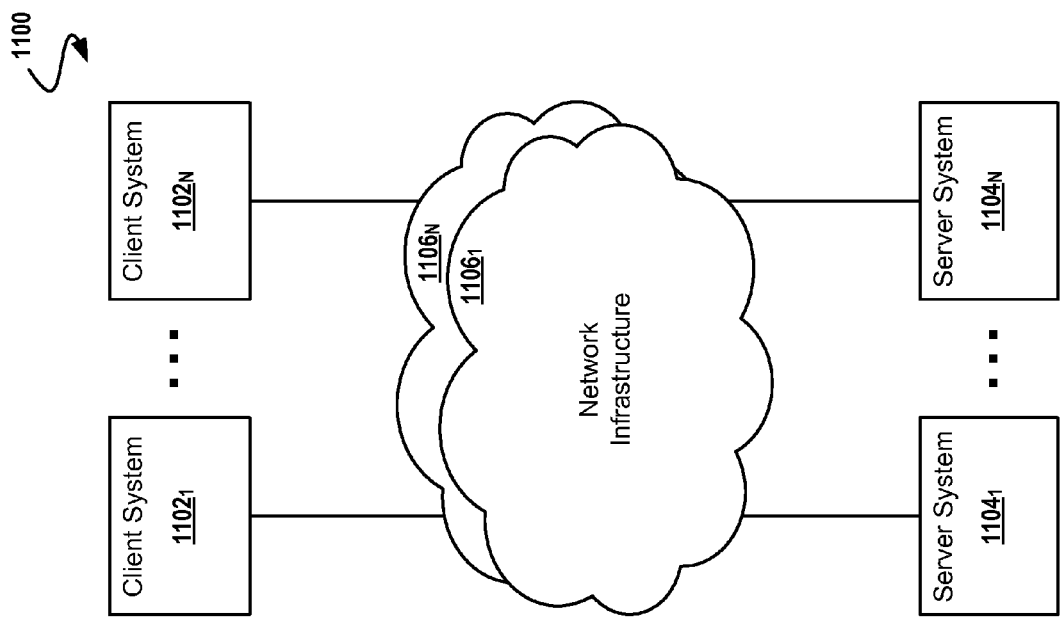

FIG. 11 depicts a computer system 1100, for implementing embodiments. The computer system 1100 includes nodes for client computer systems (e.g. client computer system $1102_1$ through client computer system $1102_N$), nodes for server computer systems (e.g. server computer system $1104_1$ through server computer system $1104_N$), and nodes for network infrastructure (e.g. network infrastructure node $1106_1$ through network infrastructure node $1106_N$), any of which nodes may comprise a machine (e.g. computer 1150) within which a set of instructions for causing the machine to perform any one of the techniques discussed above may be executed. The embodiment shown is purely exemplary, and might be implemented in the context of one or more of the figures herein.

Any node of the network may comprise a general-purpose processor, a digital signal processor (DSP), an application specific integrated circuit (ASIC), a field programmable gate array (FPGA) or other programmable logic device, a discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc.).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems (including a processor and memory), a massively parallel computer system, and/or a cloud computer system.

The computer system (e.g. computer 1150) includes a processor 1108 (e.g. a processor core, a microprocessor, a computing device, etc.), a main memory (e.g. computer memory 1110), and a static memory 1112, which communicate with each other via a bus 1114. The computer 1150 may further include a display unit (e.g. computer display 1116) that may comprise a touch-screen, or a liquid crystal display (LCD), or a light emitting diode (LED) display, or a cathode ray tube (CRT). As shown, the computer system also includes a human input/output (I/O) device 1118 (e.g. a keyboard, an alphanumeric keypad, etc.), a pointing device 1120 (e.g. a mouse, a touch screen, etc.), a drive unit 1122 (e.g. a disk drive unit, a CD/DVD drive, a tangible computer readable removable media drive, an SSD storage device, etc.), a signal generation device 1128 (e.g. a speaker, an audio output, etc.), and a network interface device 1130 (e.g. an Ethernet interface, a wired network interface, a wireless network interface, a propagated signal interface, etc.).The drive unit 1122 includes a machine-readable medium 1124 on which is stored a set of instructions (i.e. software, firmware, middleware, etc.) 1126 embodying any one, or all, of the methodologies described above. The set of instructions 1126 is also shown to reside, completely or at least partially, within the main memory and/or within the processor 1108. The set of instructions 1126 may further be transmitted or received via the network interface device 1130 over the bus 1114.

It is to be understood that embodiments of this disclosure may be used as, or to support, a set of instructions executed upon some form of processing core (such as the CPU of a computer) or otherwise implemented or realized upon or within a machine- or computer-readable medium. A machine-readable medium includes any mechanism for storing non-transitory information in a form readable by a machine (e.g. a computer). For example, a machine-readable medium includes read-only memory (ROM); random access memory (RAM); magnetic disk storage media; optical storage media; flash memory devices; and electrical, optical or acoustical or any other type of media suitable for storing non-transitory information.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

While the figures and description have been described with reference to numerous specific details, one of ordinary skill in the art will recognize that the claimed embodiments can be differently embodied in other specific forms without departing from the scope of the claims.

What is claimed is:

1. A computer implemented method to assign player entries in an online card game, the method comprising:
   receiving, by a computer, at least one preference parameter corresponding to a player-entry of a player, wherein the player-entry is currently assigned to a particular table ID at which a particular online card game is being played;
   receiving, from a fold out command generator, a fold-out command corresponding to the player-entry to fold out of a current hand of the particular online card game;
   in response to receiving the fold-out command from the fold-out command generator, performing the following:

determining a table ID of an open table satisfying at least one preference parameter when the open table is not null;

determining a table ID of a new table satisfying at least one preference parameter when the open table ID is null; and assigning the player-entry of the player to the determined table ID, wherein a game type identifier of the open table or a game type identifier of the new table is not equivalent to a game type identifier of the current hand; and causing displaying of a virtual table corresponding to the determined table ID with a player-entry of the player participating at the virtual table corresponding to the determined table ID.

2. The computer implemented method of claim 1, wherein assigning a player-entry of the player to the table ID is further based on a number of players at the table corresponding to the table ID.

3. The computer implemented method of claim 1, wherein at least one preference parameter corresponds to a game type identifier of the open table or a game type identifier of the new table or a game type identifier of the current hand.

4. The computer implemented method of claim 1, wherein at least one preference parameter corresponds to a wagering rule.

5. The computer implemented method of claim 1, wherein at least one preference parameter corresponds to a minimum number of players at the table.

6. The computer implemented method of claim 1, wherein at least one preference parameter corresponds to the maximum number of players at the table.

7. The computer implemented method of claim 1, wherein at least one of the preference parameters is specified by the player at the beginning of a session.

8. The computer implemented method of claim 1, wherein at least one preference parameter is specified in a static preference pane.

9. The computer implemented method of claim 1, wherein at least one preference parameter is specified during the current hand.

10. The computer implemented method of claim 1, wherein at least one preference parameter corresponds to the availability of player features, the player features comprising one or more of a side bet, an initial hand, or a strategy.

11. The computer implemented method of claim 1, wherein at least one preference parameter comprises at least one ranked operator-suggested game type selections.

12. A computer system to assign player entries in an online card game comprising:
    a computer processor to execute a set of program code instructions; and
    a memory to hold the program code instructions, in which the program code instructions comprises program code to perform,
    receiving at least one preference parameter corresponding to a player-entry of a player, wherein the player-entry is currently assigned to a particular table ID at which a particular online card game is being played;
    receiving, from a fold out command generator, a fold-out command corresponding to the player-entry to fold out of a current hand of the particular online card game;
    in response to receiving the fold-out command from the fold-out command generator, performing the following:
        determining a table ID of an open table satisfying at least one preference parameter when the open table is not null;
        determining a table ID of a new table satisfying at least one preference parameter when the open table ID is null; and
        assigning the player-entry of the player to the determined table ID, wherein a game type identifier of the open table or a game type identifier of the new table is not equivalent to a game type identifier of the current hand; and
    causing displaying of a virtual table corresponding to the determined table ID with the player-entry of the player participating at the virtual table corresponding to the determined table ID.

13. The computer system of claim 12, wherein assigning a player-entry of the player to the table ID is further based on a number of players at the table corresponding to the table ID.

14. The computer system of claim 12, wherein at least one preference parameter corresponds to a game type identifier of the open table or a game type identifier of the new table or a game type identifier of the current hand.

15. The computer system of claim 12, wherein at least one preference parameter corresponds to a wagering rule.

16. The computer system of claim 12, wherein at least one preference parameter corresponds to a minimum number of players at the table.

17. The computer system of claim 12, wherein at least one preference parameter corresponds to the maximum number of players at the table.

18. A computer program product embodied in a non-transitory computer readable medium, the computer readable medium having stored thereon a sequence of instructions which, when executed by a processor causes the processor to execute a process to assign player-entries in an online card game, the process comprising:
    receiving at least one preference parameter corresponding to a player-entry of a player, wherein the player-entry is currently assigned to a particular table ID at which a particular online card game is being played;
    receiving, from a fold out command generator, a fold-out command corresponding to the player-entry to fold out of a current hand of the particular online card game;
    in response to receiving the fold-out command from the fold-out command generator, performing the following:
        determining a table ID of an open table satisfying at least one preference parameter when the open table is not null;
        determining a table ID of a new table satisfying at least one preference parameter when the open table ID is null; and
        assigning the player-entry of the player to the determined table ID, wherein a game type identifier of the open table or a game type identifier of the new table is not equivalent to a game type identifier of the current hand; and
    causing displaying of a virtual table corresponding to the determined table ID with a player-entry of the player participating at the virtual table corresponding to the determined table ID.

19. The computer program product of claim 18, wherein assigning a player-entry of the player to the table ID is further based on a number of players at the table corresponding to the table ID.

* * * * *